(12) United States Patent
Uehara (10) Patent No.: US 8,368,853 B2
(45) Date of Patent: Feb. 5, 2013

(54) LIQUID CRYSTAL DISPLAY PANEL AND ELECTRONIC APPARATUS

(75) Inventor: Hideki Uehara, Tottori (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 13/030,710

(22) Filed: Feb. 18, 2011

(65) Prior Publication Data

US 2011/0211146 A1 Sep. 1, 2011

(30) Foreign Application Priority Data

Feb. 26, 2010 (JP) ................................ P2010-041672

(51) Int. Cl.
*G02F 1/3333* (2006.01)

(52) U.S. Cl. ........................................................ 349/110

(58) Field of Classification Search .................... 349/110
See application file for complete search history.

(56) References Cited

FOREIGN PATENT DOCUMENTS

| JP | 2000-250021 | 9/2000 |
|---|---|---|
| JP | 2000-310791 | 11/2000 |
| JP | 2007-193373 | 8/2007 |

*Primary Examiner* — Phu Vu
(74) *Attorney, Agent, or Firm* — K&L Gates LLP (57) ABSTRACT

A liquid crystal display panel including a first substrate and a second substrate is provided. The first substrate is provided at plural positions with a first scale pattern made of the same material as a scanning line, and extending in a row direction or a column direction, and a second scale pattern made of the same material as a signal line at plural positions, and extending in the row direction or the column direction. The second substrate is provided with a third scale pattern extending in the row direction and a fourth scale pattern extending in the column direction, respectively, at positions which are opposite to the first and second scale patterns.

6 Claims, 6 Drawing Sheets

FIG. 6C

LIQUID CRYSTAL DISPLAY PANEL AND ELECTRONIC APPARATUS

CROSS REFERENCES TO RELATED APPLICATIONS

The present application claims priority to Japanese Patent Application JP 2010-041672 filed on Feb. 26, 2010, the entire contents of which is hereby incorporated by reference.

BACKGROUND

The present disclosure relates to a liquid crystal display panel with enhanced definition and an electronic apparatus using the same, and more particularly, to a liquid crystal display panel with enhanced definition which is able to accurately align positions of a pair of substrates to obtain a good quality of display image, and an electronic apparatus using the same.

Due to advantages of liquid crystal display panels which are able to be made thinner, lighter and smaller, liquid crystal display panels are employed as a display apparatus for various kinds of electronic apparatuses, such as televisions, personal computers, mobile phones, mobile information terminals. The liquid crystal display panel includes a configuration of which a pair of array substrates and a color filter substrate are made of a glass plate or the like; a frame sealing member is disposed on outer peripheries between the pair of substrates; the pair of substrates are adhered to each other to form a predetermined space therebetween; and a liquid crystal is sealed in the space.

The liquid crystal display panel is necessary for enhanced transmittance and enhanced contrast in a display screen. For this reason, a color filter provided on a color filter substrate has been variously modified. In general, as a light shielding layer used in the color filter substrate, a light shielding layer made of a metallic film such as chromium, or a light shielding layer made of a resin material is used.

The light shielding layer formed on the color filter substrate is formed in such a manner that the light shielding layer is overlapped with a scanning line and a signal line of an array substrate in a displaying region in a plan view, so that an area of the light shielding portion is decreased thereby increasing an aperture ratio. However, since a position aligning error occurs upon attachment of the array substrate and the color filter substrate to each other, the light shielding member forming the color filter layer is formed thickly in expectation of the position aligning error. For this reason, in the case of using the light shielding layer made of the metallic film or the light shielding layer made of the resin material, it is difficult for the liquid crystal display panel with enhanced definition to enhance the aperture ratio.

As a means for solving the above-described problems, for example, Japanese Unexamined Patent Application Publication No. 2000-310791 discloses a liquid crystal display panel including a light shielding layer which is formed by layering color filters of different colors as a light shielding layer formed on a color filter substrate. That is, according to the liquid crystal display panel disclosed in Japanese Unexamined Patent Application Publication No. 2000-310791, when each color filter material layer of red, green and blue is formed in order at a predetermined position, end portions of the color filter materials of different color adjacent to each other are superimposed to form the light shielding layer. As a result, since the light shielding layer is formed to have a width smaller than that of the light shielding layer made of the metallic film or the light shielding layer made of the resin material according to the related art, it is possible to improve the aperture ratio.

SUMMARY

According to the liquid crystal display panel disclosed in Japanese Unexamined Patent Application Publication No. 2000-310791, since the color filter layer of each color is formed in a stripe pattern upon attachment of the array substrate and the color filter substrate to each other, the attachment misalignment along at least a column direction does not cause color mixing. In addition, the liquid crystal display panel disclosed in Japanese Unexamined Patent Application Publication No. 2000-310791 is able to be applied to even a liquid crystal display panel of a transverse electric field type or a liquid crystal display panel of a vertical electric field type.

However, if the stacked color filter is used as the light shielding layer, high precision is necessary for the position alignment between the color filter substrate and the array substrate. In the case where the light shielding layer is made of the stacked color filter which is formed on the color filter substrate, if positional displacement occurs in any one of a column direction and a row direction upon attachment of the color filter substrate and the array substrate to each other, it causes color mixing. Such a problem is significant, in particular, in the case of the liquid crystal display panel with enhanced definition.

In order to reduce the positional displacement upon attachment of the array substrate and the color filter substrate to each other, a position verification mark (refer to Japanese Unexamined Patent Application Publication No. 2000-250021) or a position verification pattern (hereinafter referred to as a "scale pattern"), (refer to Japanese Unexamined Patent Application Publication No. 2007-193373) is formed at peripheries of the array substrate and the color filter substrate. In particular, since the scale pattern is able to quantitatively figure out the degree of the positional displacement in the column direction and the row direction, the appropriate effect is able to be achieved in the case where the position alignment of high precision is necessary.

The scale pattern of the related art is formed on the array substrate side by a gate metal, and is formed on the color filter substrate side by the light shielding layer. However, during the manufacturing of the liquid crystal display panel, the positional displacement of an exposure mask when a signal line is formed should be considered. According to the related art, since the scale pattern of the array substrate side is formed by a gate metal, the positional displacement of the signal line is caused by the positional displacement of the exposure mask when the signal line is formed, or the like, but it is not taken into consideration.

The present embodiments address the above-identified, and other problems associated with the related art, and it is desirable to provide a liquid crystal display panel with enhanced definition, which is able to precisely align positions of an array substrate and a color filter substrate in view of positional displacement of a signal line to improve contrast, reduce color mixing, and obtain a good quality of display image.

According to an embodiment, there is provided a liquid crystal display panel including: a first substrate and a second substrate which are arranged so as to be opposite to each other, with a liquid crystal layer being interposed therebetween; the first substrate including a plurality of scanning lines and a plurality of signal lines which are formed so as to intersect each other in a state where the scanning lines and the signal lines are insulated from each other, and sub-pixels defined by the scanning lines and the signal lines, the second substrate including a light shielding layer formed at a position which is opposite to the scanning line and the signal line in a plan view, and a color filter layer formed for each sub-pixel which is defined by the scanning line and the signal line, and the first substrate including a transparent electrode, wherein the first substrate is provided with a first scale pattern made of the same material as the scanning line and extending in a column direction or a row direction, and a second scale pattern made of the same material as the signal line, and extending in the column direction or the row direction, at plural positions, and the second substrate is provided with a third scale pattern extending in the row direction and a fourth scale pattern extending in the column direction, respectively, at positions which are opposite to the first and second scale patterns.

In the liquid crystal display panel according to an embodiment, the first substrate is provided with the first scale pattern made of the same material as the scanning line and extending in the column direction or the row direction, and the second scale pattern made of the same material as the signal line, and extending in the column direction or the row direction, at plural positions. In this instance, if the first scale pattern and the second scale pattern are formed in such a manner that if one of the first scale pattern and the second scale pattern extends in the row direction, the other extends in the column direction. In addition, the first scale pattern and the second scale pattern may be identical to each other or be different from each other, and may employ an arbitrary scale pattern.

In the liquid crystal display panel according to an embodiment, when mask displacement occurs at the time of forming the signal line, the mask displacement appears at the first or second scale pattern formed in the column direction. For this reason, if the positions of the first substrate and the second substrate are aligned in such a manner that the first and second scale patterns formed on the first substrate are accurately overlapped with the third and fourth scale patterns formed on the second substrate, it is possible to place the light shielding layer formed on the second substrate at the position which is opposite to the signal line, for example, even though there is the mask displacement at the time of forming the signal line. As a result, in the liquid crystal display panel according to an embodiment, since it is possible to suppress the positional displacement of the light shielding layer, the light leakage is able to be suppressed even though the width of the light shielding layer is narrowed. Therefore, it is possible to obtain the liquid crystal display panel with the enhanced definition, of which a contrast is good, an aperture ratio is high, color mixing is reduced, and a good display quality is obtained.

In the liquid crystal display panel according to an embodiment, it is desirable that the third scale pattern and the fourth scale pattern are made of the same material as the color filter layer.

In the liquid crystal display panel according to an embodiment, since the third scale pattern and the fourth scale pattern are made of the same material as the color filter layer, it is not necessary to separately provide processes of forming the third and fourth scale patterns, and it is possible to reduce the number of used materials. In this instance, the third and fourth scale patterns may be formed in a single layer, or in multiple stack layers.

In addition, since the first and second scale patterns are made of the same material as the scanning line or the signal line, the first and second scale patterns are made of a metal material such as aluminum or the like to thereby have metallic gloss. On the other hand, since the third and fourth scale patterns have a color corresponding to the color of the corresponding color filter layer even though the third and fourth scale patterns are made of a single layer, it is possible to clearly visually recognize the first and second scale patterns. For this reason, in liquid crystal display panel according to an embodiment, it is possible to easily and accurately align the positions of the first substrate and the second substrate.

In addition, in the liquid crystal display panel according to an embodiment, it is desirable that the light shielding layer is formed by overlapping end portions of the adjacent color filter layers.

In the liquid crystal display panel according to an embodiment, it is possible to easily form the light shielding film by overlapping the adjacent color filter layers at the positions corresponding to the signal line of the first substrate which are positioned at both sides of each sub-pixel, even though the light shielding layer made of a metallic film or the light shielding layer made of a resin material according to the related art is not formed. In this instance, the light shielding layer formed by overlapping the end portions of the adjacent color filter layers may be formed at the position which is opposite to the scanning line or a switching element, as well as the position which is opposite to the signal line.

Further, in the liquid crystal display panel according to an embodiment, the transparent electrode formed for each sub-pixel which is defined by the scanning line and the signal line is a pixel electrode, and the first substrate may further include a common electrode which is electrically insulated from the pixel electrode.

The liquid crystal display panel according to an embodiment is a liquid crystal display panel of a transverse electric field type, since the first substrate is provided with the pixel electrode and the common electrode. For this reason, in the liquid crystal display panel according to an embodiment, since the position displacement of the first substrate and the second substrate is small, it is possible to obtain the liquid crystal display panel with the enhanced definition which is operated in the transverse electric field type, of which a contrast is good, an aperture ratio is high, color mixing is reduced, and a good display quality is obtained. The liquid crystal display panel of the transverse electric field type is able to be applied to one which is operated in an IPS mode, as well as one which is operated in an FFS mode.

In addition, in the liquid crystal display panel according to an embodiment, it is desirable that the transparent electrode is formed in one layer on each of the first substrate and the second substrate.

In the liquid crystal display panel according to an embodiment, since the positions of the first substrate and the second substrate are able to be accurately aligned, it is possible to obtain the liquid crystal display panel with the enhanced definition which is operated in a vertical field electric field type, of which a contrast is good, an aperture ratio is high, color mixing is reduced, and a good display quality is obtained.

According to an embodiment, there is provided an electronic apparatus including the liquid crystal display panel according to any one of the above-described configurations.

In the electronic apparatus according to an embodiment, it is possible to obtain the electronic apparatus including the liquid crystal display panel which is able to achieve the above-described effects.

Additional features and advantages are described herein, and will be apparent from the following Detailed Description and the figures.

DETAILED DESCRIPTION

Hereinafter, embodiments will be described with reference to the drawings. In the drawings used for the description of the specification, the scales of layers or members are different from and not necessarily proportional to the actual sizes thereof for the purpose of enabling easy visual recognition of the layers and the members in the drawings. In addition, the expression "in a plan view" herein means a state seen at a direction perpendicular to a color filter substrate (second substrate) which is a display surface.

Figure 1:
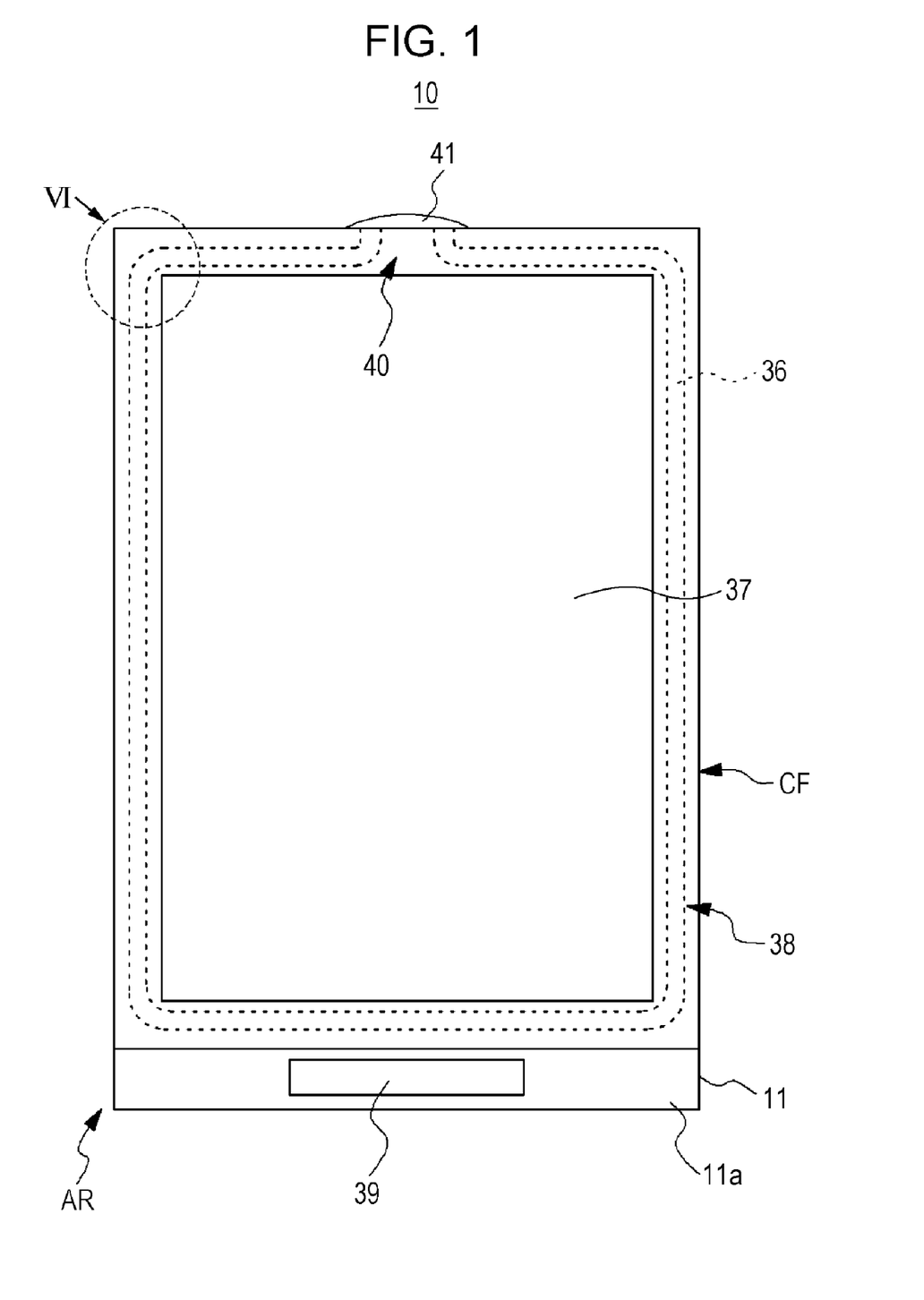
FIG. 1 is a plan view of an FFS mode liquid crystal display panel according to an embodiment.
Figure 2:
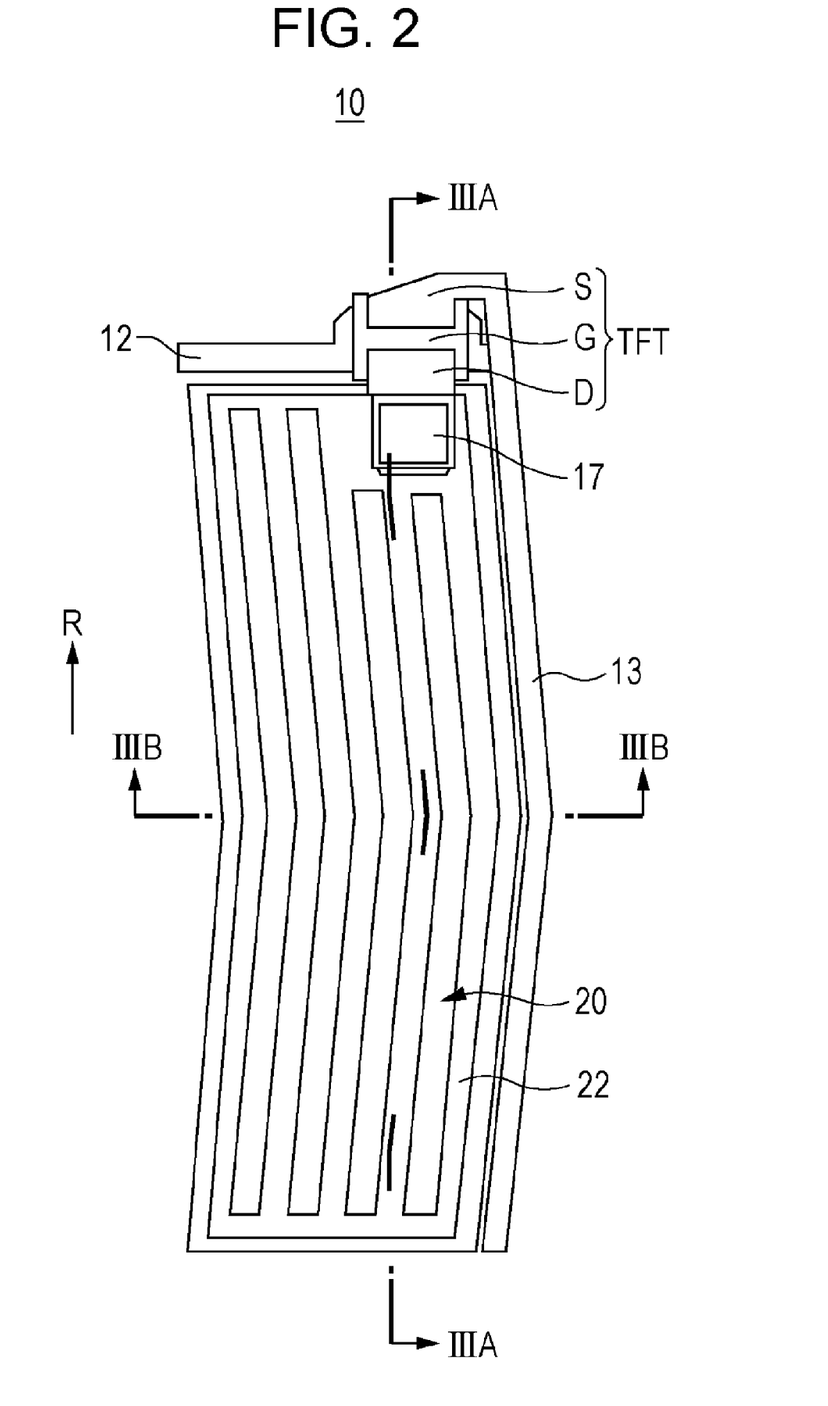
FIG. 2 is a plan view of one sub-pixel of an FFS mode liquid crystal display panel according to an embodiment.
Figure 3A:
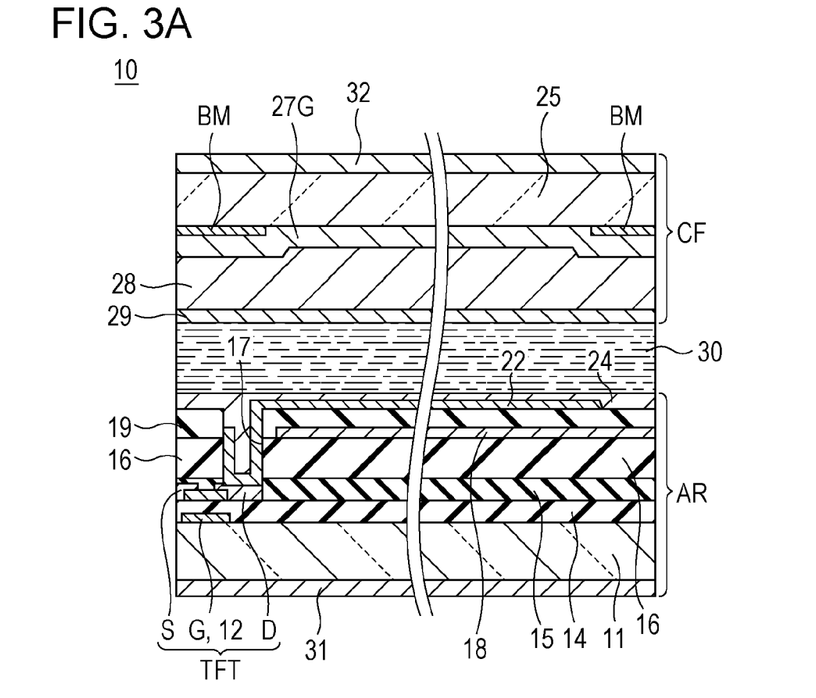
FIG. 3A is a cross-sectional view along the line IIIA-IIIA in FIG. 2.
Figure 3B:
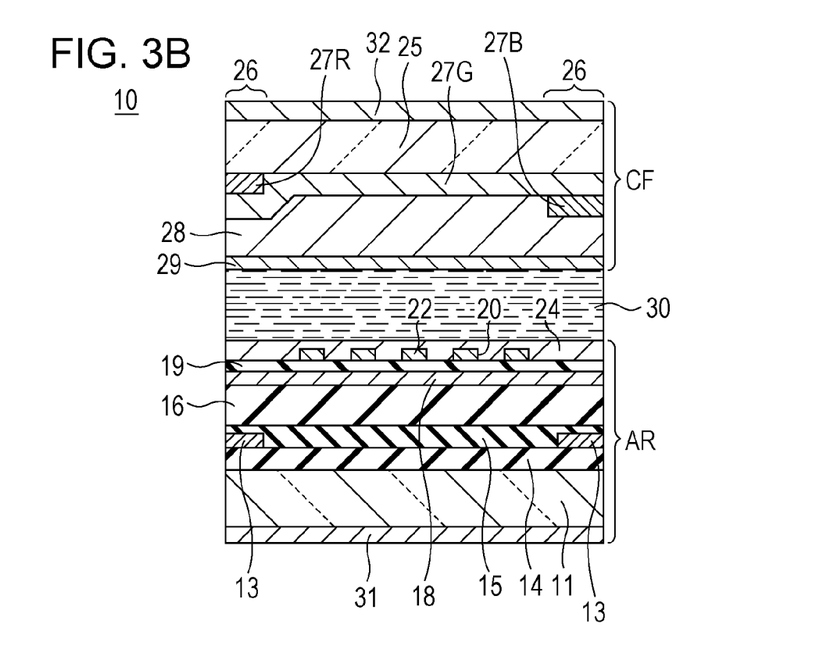
FIG. 3B is a cross-sectional view along the line IIIB-IIIB in FIG. 2.

First, a schematic configuration of an FFS mode liquid crystal display panel 10 according to an embodiment will be described with reference to FIGS. 1 to 3. Herein, FIG. 1 is a plan view of the FFS mode liquid crystal display panel according to an embodiment. FIG. 2 is a plan view of one sub-pixel of the FFS mode liquid crystal display panel according to an embodiment. FIG. 3A is a cross-sectional view along the line IIIA-IIIA in FIG. 2, and FIG. 3B is a cross-sectional view along the line IIIB-IIIB in FIG. 2.

The liquid crystal display panel 10 according to an embodiment includes an array substrate AR (corresponding to a first substrate of the embodiment), of which various lines are formed on a first transparent substrate 11 made of glass or the like, and a color filter substrate CF (corresponding to a second substrate), of which color filter layers 27R, 27G, and 27B of, for example, red (R), green (G), and blue (B) or the like are formed on a second transparent substrate 25 made of glass or the like, with the color filter substrate CF being arranged so as to be opposite to the array substrate AR. The array substrate AR and the color filter substrate CF are adhered to each other by a sealing member 36 at their peripheries, and a liquid crystal 30 is sealed in the space formed by the sealing member 36. The portion enclosed by the sealing member 36 and filled with the liquid crystal 30 serves as a displaying area 37, and an outside of the displaying area 37 serves as a non-displaying area 38 (hereinafter referred to as a frame area).

The array substrate AR is slightly larger in size than the color filter substrate CF so as to form a protruded portion having a predetermined space when being arranged so as to be opposite to the color filter substrate CF. The protruded portion serves as a mounting area which is provided with a driver IC 39 for driving the liquid crystal 30, or the like. In addition, the liquid crystal display panel 10 is exemplified in such a way that a liquid crystal injecting hole 40 is formed by the sealing member 36, and the liquid crystal injecting hole 40 is sealed by the sealing member 41.

On the surface of the display area of the first transparent substrate 11, made of the glass substrate or the like, of the array substrate AR, a plurality of scanning lines 12 and a plurality of signal lines 13 are formed in a matrix pattern so as to intersect to each other in a state where the scanning lines 12 and the signal lines 13 are insulated from each other by a gate insulation film 14. In addition, a common line (not illustrated) is formed on an edge portion of the displaying area 37. Each area enclosed by the scanning line 12 and the signal line 13 forms one sub-pixel. The first transparent substrate 11 is provided with, for example, a thin film transistor TFT, which serves as a switching element, for each pixel. The whole surface of the first transparent substrate 11 including the thin film transistor TFT is covered by, for example, a passivation film 15 made of a silicon nitride layer or a silicon oxide layer.

A planarized film 16 made of an organic material is formed on the surface of the passivation film 15, and the planarized film 16 and the passivation film 15 are provided with a contact hole 17 at a position corresponding to a drain electrode D of the thin film transistor TFT. The surface of the planarized film 16 is provided with a lower electrode 18 made of a transparent conductive material, such as ITO (indium tin oxide) or IZO (indium zinc oxide), in a shape covering the whole surface, except for the area in which the thin film transistor TFT is formed, and the area in which the contact hole 17 is formed. The lower electrode 18 is connected to the common line at the edge portion of the displaying area which is not illustrated, and thus acts as a common electrode.

An insulating film 19 made of a silicon nitride layer or a silicon oxide layer is formed on the whole surface of the first transparent substrate 11 formed with the lower electrode 18. An upper electrode 22 made of a transparent conductive material, such as ITO or IZO, is formed at each sub-pixel on the surface of the insulating film 19. The upper electrode 22 is provided with a slit-shaped opening 20 having a predetermined width which is bent in the shape of a "<" character. In addition, the upper electrode 22 is electrically connected to the drain electrode D of the thin film transistor TFT via the contact hole 17, and thus acts as the pixel electrode.

In this instance, any one of the upper electrode 22 and the lower electrode 18 may be electrically connected to the drain electrode D of the thin film transistor TFT or electrically connected to the common line. In addition, a first orientation film 24 is formed on the whole surface of the displaying area 37 so as to include the surface of the upper electrode 22 and the slit-shaped opening 20. The first orientation film 24 is subjected to rubbing treatment, for example, in a specific direction R so as to orient crystalline molecules in a specific direction.

In addition, the color filter substrate CF is provided with a light shielding layer 26 and a light shielding member BM, as shown in FIGS. 3A and 3B, on the surface of the second transparent substrate 25, such as a glass substrate, so as to cover positions corresponding to the scanning line 12, the signal line 13, the contact hole 17, and the thin film transistor TFT of the array substrate AR. In addition, color filter layers 27R, 27G and 27B of, for example, red (R), green (G) and blue (B) are respectively formed on the surface of the second transparent substrate 25 enclosed by the light shielding layer 26 and the light shielding member BM. In this instance, the detailed configuration of the color filter layers 27R, 27G and 27B, the light shielding layer 26 and the light shielding member BM and a forming method thereof will be described hereinafter.

An overcoat layer 28 is formed so as to coat the surfaces of the light shielding layer 26, the light shielding member BM and the color filter layer 27. A second orientation film 29 is formed on the surface of the overcoat layer 28. The second orientation film 29 is subjected to rubbing treatment in a direction of 180° offset from the first orientation film 24. The array substrate AR is opposite to the color filter substrate CF in such a way that the upper electrode 22 of the array substrate AR and the color filter layer 27 of the color filter substrate CF are opposite to each other, and the liquid crystal 30 is sealed therebetween. In addition, a first polarization plate 31 and a backlight device (not illustrated) are placed on the outside of the array substrate AR, and a second polarization plate 32 is placed on the outside of the color filter substrate CF, thereby completing the liquid crystal display panel 10 according to an embodiment.

The arrangement of the scanning lines 12, the signal lines 13, and the gate electrode G, the source electrode S, and the drain electrode D of the thin film transistor TFT with respect to the plurality of sub-pixels of the array substrate AR formed as described above is shown in FIG. 4A. Since the signal line 13 is bent in the shape of a "<" character for each sub-pixel, the shape of each sub-pixel in a plan view is bent in the shape of a "<" character. For this reason, the shape of the respective color filter layers 27R, 27G and 27B of each color formed on the color filter substrate CF is also bent in the shape of a "<" character depending upon the shape of each sub-pixel.

Figure 4A:
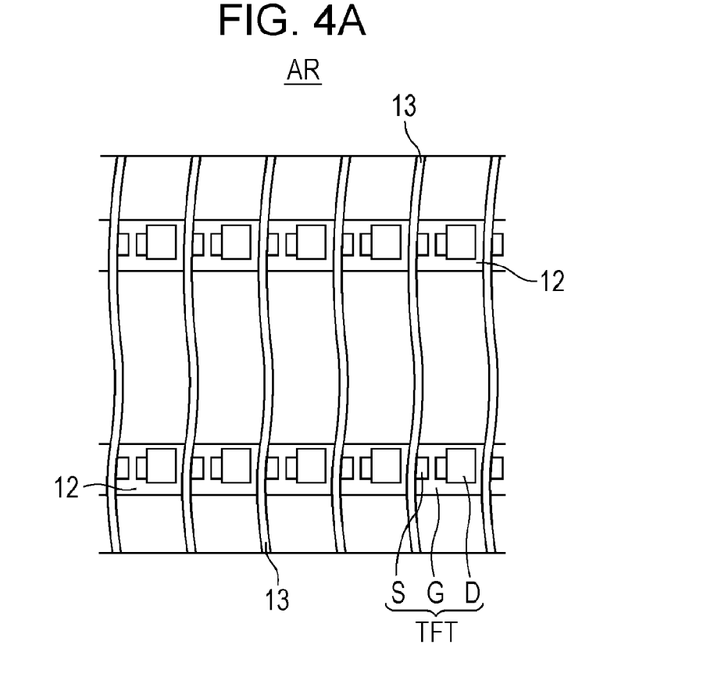
FIG. 4A is a plan view of an array substrate for several sub-pixels.
Figure 4B:
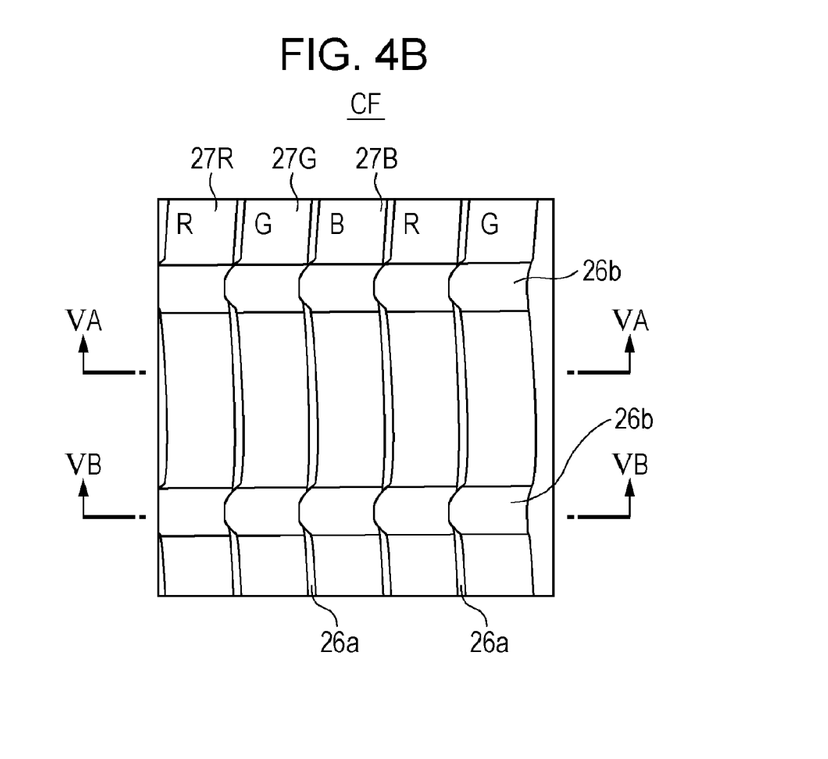
FIG. 4B is a plan view of a color filter substrate.
Figure 5:
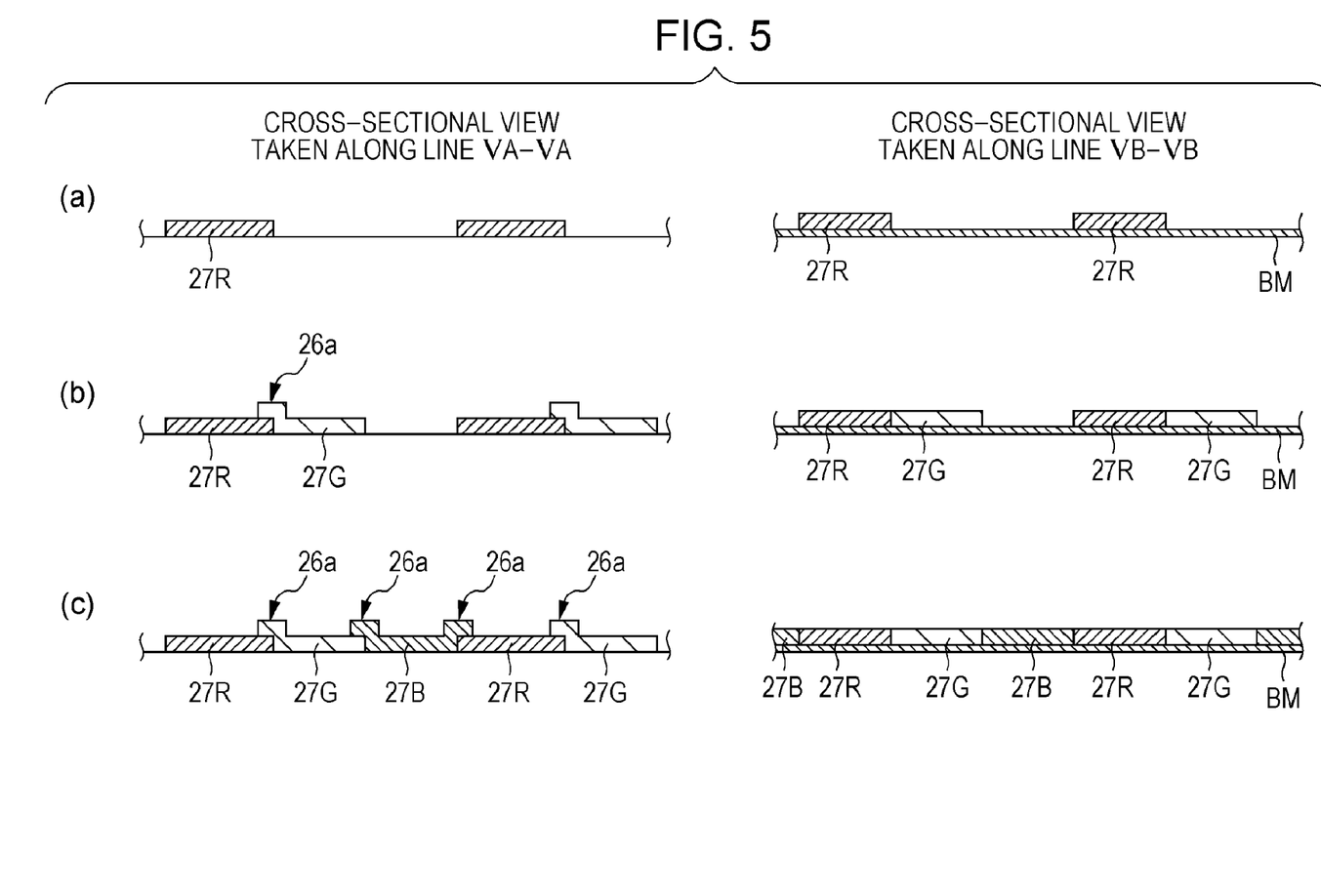
FIGS. 5A to 5C are cross-sectional views illustrating a flow of manufacturing the portions which are taken along the line VA-VA and the line VB-VB in FIGS. 4A and 4B.

The method of forming the color filter layers 27R, 27G and 27B, the light shielding layer 26, and the light shielding member BM of the color filter substrate CF will be described with reference to FIGS. 4A and 4B and FIGS. 5A to 5C. In this instance, FIG. 4A is a plan view of the array substrate for several sub-pixels, and FIG. 4B is a plan view of the color filter substrate. FIGS. 5A to 5C are cross-sectional views illustrating a flow of manufacturing the portions which are taken along the line VA-VA and the line VB-VB in FIGS. 4A and 4B. In FIGS. 5A to 5C, the upper side is shown as a liquid crystal layer side.

For example, the light shielding member BM (corresponding to the "light shielding layer") is first formed so as to shield the position opposite to at least the scanning line 12 and the TFT. In this instance, the light shielding member BM is not formed along the signal line 13, but the light shielding member BM may be formed along the signal line 13. A metal member made of chromium, or a light shielding member made of a resin material is able to be used as the light shielding member BM. Subsequently, the color filter layer 27R of red (R) is formed in the stripe pattern which is bent in the shape of a "<" character. In this instance, the color filter layer 27R of red (R) is formed so as to coat the positions corresponding to the signal lines 13 of the array substrate AR which are positioned at both sides of the sub-pixel, and cover the light shielding member BM. At that time, it may be determined whether or not the color filter layer 27R of red (R) on the light shielding member BM has coated the positions corresponding to the signal lines 13 of the array substrate AR which are positioned at both sides of the sub-pixel. The cross-sectional view of the portion taken along the line VA-VA and the line VB-VB in FIGS. 4A and 4B in this state is shown in FIG. 5A.

Subsequently, the color filter layer 27G of green (G) is formed in the stripe pattern which is bent in the shape of a "<" character. In this instance, the color filter layer 27G of green (G) is formed so as to coat the positions corresponding to the signal lines 13 of the array substrate AR which are positioned at both sides of the sub-pixel, and cover the light shielding member BM. That is, the color filter layer 27G of green (G) is formed in the stripe pattern which is bent in the shape of a "<" character, is coated in such a way that a portion is superimposed with the color filter layer 27R of red (R) which is formed at the position corresponding to the signal line 13 of the array substrate AR, and is formed so as to cover the light shielding member BM.

The cross-sectional view of the portion taken along the line VA-VA and the line VB-VB in FIGS. 4A and 4B in this state is shown in FIG. 5B. In this instance, the overlapped portion of the color filter layer 27R of red (R) and the color filter layer 27G of green (G) formed at that time serves as the light shielding layer 26. At that time, it is possible to determine whether or not the color filter layer 27G of green (G) on the light shielding member BM coats the positions corresponding to the signal lines 13 of the array substrate AR which are positioned at both sides of the sub-pixel, that is, whether or not the color filter layer 27R of red (R) and the color filter layer 27G of green (G) are overlapped with each other on the light shielding member BM. Herein, an example, in which the color filter layer 27G of green (G) is formed so as not to be overlapped with the color filter layer 27R of red (R), is shown.

In addition, the color filter layer 27B of blue (B) is formed in the stripe pattern which is bent in the shape of a "<" character. In this instance, the color filter layer 27B of blue (B) is formed so as to coat the positions corresponding to the signal lines 13 of the array substrate AR which are positioned at both sides of the sub-pixel, and cover the light shielding member BM. That is, the color filter layer 27B of blue (B) is formed in the stripe pattern which is bent in the shape of a "<" character, is coated in such a way that a portion is superimposed with the color filter layer 27R of red (R) and the color filter layer 27G of green (G) which are formed at the positions corresponding to the signal lines 13 of the array substrate AR, and is formed so as to cover the light shielding member BM.

The cross-sectional view of the portion taken along the line VA-VA and the line VB-VB in FIGS. 4A and 4B in this state is shown in FIG. 5C. In this instance, the overlapped portion of the color filter layer 27B of blue (B) and the color filter layer 27G of green (G) formed at that time and the overlapped portion of the color filter layer 27B of blue (B) and the color filter layer 27R of red (R) serve as the light shielding layer 26, respectively. At that time, it may be determined whether or not the color filter layer 27B of blue (B) on the light shielding member BM has coated the positions corresponding to the signal lines 13 of the array substrate AR which are positioned at both sides of the sub-pixel, that is, whether or not the color filter layer 27B of blue (B) is overlapped with the color filter layer 27G of green (G) and the color filter layer 27R of red (R) on the light shielding member BM. Herein, an example, in which the color filter layer 27B of blue (B) is formed so as not to be overlapped with the color filter layer 27R of red (R) and the color filter layer 27G of green (G), is shown.

Even though the light shielding layer made of the metallic film or the light shielding layer made of a resin material according to the related art is not formed at the positions corresponding to the signal line 13 of the array substrate AR which are positioned at both sides of the sub-pixel, the adjacent color filter layers are formed so as to be overlapped with each other, thereby forming the light shielding layer 26.

Figure 6A:
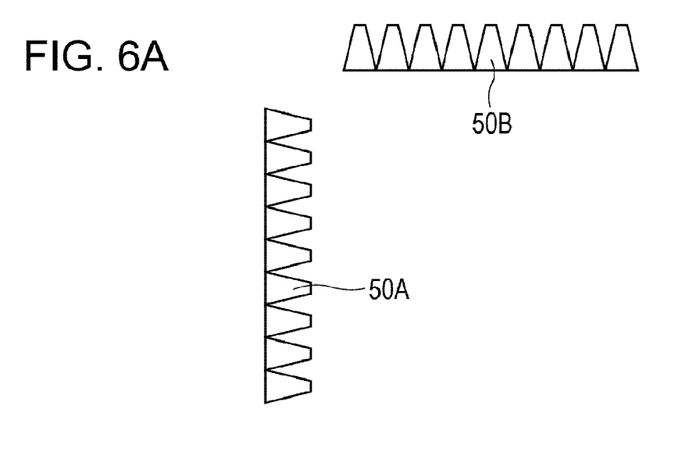
FIG. 6A is a plan view illustrating first and second scale patterns of the portion designated by VI in FIG. 1.
Figure 6B:
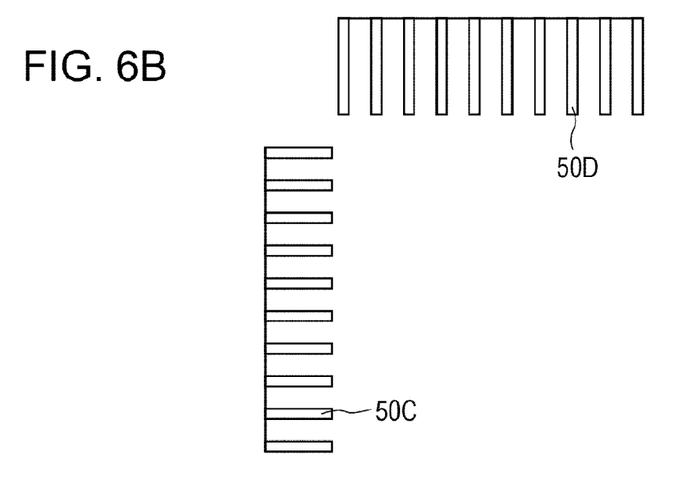
FIG. 6B is a plan view illustrating third and fourth scale patterns.
Figure 6C:
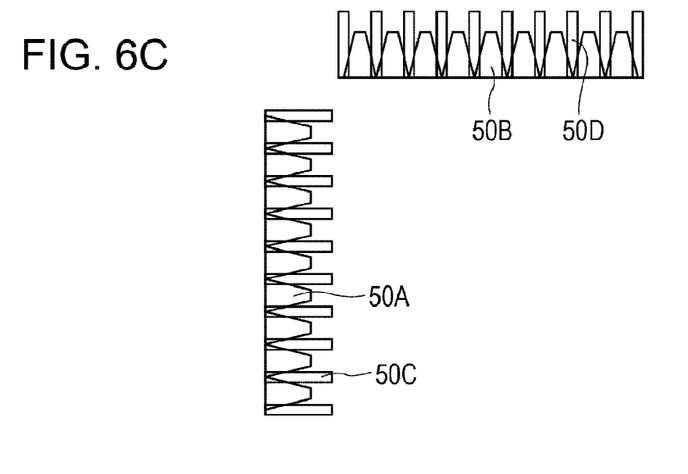
FIG. 6C is a plan view illustrating a visual recognition state of first to fourth scale patterns.

Next, the scale pattern for aligning the position in the liquid crystal display panel according to an embodiment will be described with reference to FIGS. 6A to 6C. In this instance, FIG. 6A is a plan view illustrating first and second scale patterns formed on the array substrate of the portion designated by VI in FIG. 1, FIG. 6B is a plan view illustrating third and fourth scale patterns formed on the color filter substrate, and FIG. 6C is a plan view illustrating a visual recognition state of first to fourth scale patterns. In this instance, FIGS. 6A to 6C are views of the state which is visually recognized from the color filter substrate CF side of the liquid crystal display panel 10.

At the time of forming the scanning line 12 (refer to FIG. 2) in the array substrate AR, a first scale pattern 50A is initially formed on at least two portions at the outer circumference of the displaying area, for example, so as to extend in the column direction. The first scale pattern 50A is formed with a combination of trapezoidal-shaped scales in FIG. 6A, but may employ an arbitrary shape, such as a scale pattern of a general scale or a scale pattern of a cross shape. Then, at the time of forming the signal line 13 (refer to FIG. 2), a second scale pattern 50B is formed on at least two portions so as to extend in a direction perpendicular to the first scale pattern 50A, for example a row direction. The second scale pattern 50B may employ the same shape as the first scale pattern 50A, if the formation direction is different.

The second scale pattern 50B may be overlapped with the first scale pattern 50A, but the second scale pattern may not be overlapped with the first scale pattern. In order to easily align the positions of the array substrate AR and the color filter substrate CF, it is desirable to form the array substrate AR and the color filter substrate CF at positions which is able to be seen and recognized at the same time.

Then, in the color filter substrate CF, a third scale pattern 50C is formed at a position opposite to the first scale pattern 50A formed on the array substrate AR, and a fourth scale pattern 50D is formed at a position opposite to the second scale pattern 50B formed on the array substrate AR. The third and fourth scale patterns 50C and 50D may have the same shape as the first and second scale patterns 50A and 50B, but may have different shapes so as to be easily distinguishable. In addition, the third and fourth scale patterns 50C and 50D may be formed in a single layer made of the same material, or in multiple stack layers, at the time of forming the color filter layers 27R, 27G, and 27B.

If the third and fourth scale patterns 50C and 50D are made of the same material as the color filter layers 27R, 27G, and 27B, a process of separately forming the third and fourth scale patterns 50C and 50D is not necessary, and it is possible to reduce the number of materials used. In this instance, since the first and second scale patterns 50A and 50B are made of a metal material such as aluminum, although the third and fourth scale patterns 50C and 50D are made of a single layer, it is possible to clearly visually recognize the third and fourth scale patterns 50C and 50D from the first and second scale patterns 50A and 50B.

The position alignment of the array substrate AR and the color filter substrate CF is able to be performed by adjusting the positions in the row direction and the column direction while visually recognizing the overlapped state of the first and second scale patterns 50A and 50B formed on the array substrate AR and the third and fourth scale patterns 50C and 50D formed on the color filter substrate CF which are respectively formed at plural positions, as shown in FIG. 6C. In this instance, it is possible to perform the visual recognition of the first to fourth scale patterns 50A to 50D by using a loupe having about 20-fold magnification, or by capturing it with an imaging element.

Since the process of manufacturing the first scale pattern 50A and the second scale pattern 50B is separated into a process of manufacturing the scanning line and a process of manufacturing the signal line to form the first and second scale patterns 50A and 50B, even if the displacement occurs in the formation position due to the mask displacement at the time of forming the signal line, the displacement appears as the positional displacement of the second scale pattern 50B, so that it is possible to accurately align the positions of the array substrate AR and the color filter substrate CF. For this reason, in the liquid crystal display panel 10 according to an embodiment, it is possible to obtain the liquid crystal display panel with a good contrast, in which light leakage is reduced even in the enhanced definition, and thus a good quality of the display image is obtained.

In the liquid crystal display panel 10 according to an embodiment, an example, in which the light shielding layer 26 is formed by overlapping the color filter layer, is shown. However, since the feature of the liquid crystal display panel according to an embodiment is applied to the first to fourth scale patterns 50A to 50D, it is also able to be applied to the liquid crystal display panel 10 formed by the light shielding layer made of the metallic film or the light shielding layer made of the resin material, according to the related art, as the light shielding layer 26. In this instance, the third and fourth scale patterns may be formed by the same material as the light shielding layer made of the metal film or the resin material.

Similarly, in the liquid crystal display panel 10 according to an embodiment, although the case of the FFS mode liquid crystal display panel of a transverse electric field type has been described, it is possible to apply it to an IPS mode liquid crystal display panel of a transverse electric field type, and a TN (twisted nematic) mode, VA (vertical alignment) mode, MVA (multi-domain vertical alignment) mode, or ECB mode liquid crystal display panel of a vertical electric field type.

In addition, in the liquid crystal display panel 10 according to an embodiment, although the cases, where the shape of each sub-pixel is bend in the shape of a "<" character and the slit-shaped opening formed in the upper electrode is formed in the shape of a "<" character, has been described in the FFS mode liquid crystal display panel of a transverse electric field type, it is not limited thereto. It is possible to be similarly applied it to a case where the shape of each sub-pixel is a rectangular shape or the slit-shaped opening is formed in a straight shape.

Hereinbefore, the example of the liquid crystal display panel has been described as the embodiment. Such a liquid crystal display panel according to an embodiment is able to be used in various electronic apparatuses such as personal computers, cellular phones, mobile information terminals, car navigation systems, or the like. In this instance, the basic configuration of various electronic apparatuses is well known to those skilled in the art, and thus detailed description thereof will be omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel comprising:
   a first substrate and a second substrate which are arranged so as to be opposite to each other, with a liquid crystal layer being interposed therebetween;
   the first substrate including a plurality of scanning lines and a plurality of signal lines which are formed so as to intersect each other in a state where the scanning lines and the signal lines are insulated from each other, and sub-pixels defined by the scanning lines and the signal lines,
   the second substrate including a light shielding layer formed at a position which is opposite to the scanning line and the signal line in a plan view, and a color filter layer formed for each sub-pixel which is defined by the scanning line and the signal line, and the first substrate including a transparent electrode, wherein the first substrate is provided with a first scale pattern made of the same material as the scanning line, and extending in a row direction or a column direction and a second scale pattern made of the same material as the signal line, and extending in the row direction or the column direction, at plural positions, and the second substrate is provided with a third scale pattern extending in the row direction and a fourth scale pattern extending in the column direction, respectively, at positions which are opposite to the first and second scale patterns.

2. The liquid crystal display panel according to claim 1, wherein the third scale pattern and the fourth scale pattern are made of the same material as the color filter layer.

3. The liquid crystal display panel according to claim 1, wherein the light shielding layer is formed by overlapping end portions of the adjacent color filter layers.

4. The liquid crystal display panel according to claim 1, wherein the transparent electrode formed for each sub-pixel which is defined by the scanning line and the signal line is a pixel electrode, and the first substrate further includes a common electrode which is electrically insulated from the pixel electrode.

5. The liquid crystal display panel according to claim 1, wherein the transparent electrode is formed in one layer on each of the first substrate and the second substrate.

6. An electronic apparatus comprising the liquid crystal display panel according to claim 1.

* * * * *